(12) United States Patent
Tanno et al.

(10) Patent No.: US 7,823,613 B2
(45) Date of Patent: Nov. 2, 2010

(54) PNEUMATIC TIRE

(75) Inventors: Atsushi Tanno, Hiratsuka (JP); Hiroshi Yamauchi, Tokyo (JP)

(73) Assignees: The Yokohama Rubber Co., Ltd., Tokyo (JP); Mitsubishi Jidosha Kogyo Kabushiki Kaisha, Tokyo (JP)

( * ) Notice: Subject to any disclaimer, the term of this patent is extended or adjusted under 35 U.S.C. 154(b) by 751 days.

(21) Appl. No.: 11/632,591

(22) PCT Filed: Aug. 3, 2005

(86) PCT No.: PCT/JP2005/014173

§ 371 (c)(1),
(2), (4) Date: Jan. 16, 2007

(87) PCT Pub. No.: WO2006/013874

PCT Pub. Date: Feb. 9, 2006

(65) Prior Publication Data

US 2008/0073016 A1 Mar. 27, 2008

(30) Foreign Application Priority Data

Aug. 4, 2004 (JP) .............................. 2004-227594

(51) Int. Cl.
*B60C 5/00* (2006.01)
*B60C 19/00* (2006.01)
(52) U.S. Cl. ...................... 152/450; 152/155; 152/157; 152/158
(58) Field of Classification Search .................. 152/158
See application file for complete search history.

(56) References Cited

U.S. PATENT DOCUMENTS

| 2005/0098251 A1 | 5/2005 | Yukawa |
| 2006/0231185 A1 | 10/2006 | Tanno |
| 2008/0099117 A1 | 5/2008 | Tanno |
| 2009/0053492 A1 | 2/2009 | Tanno et al. |
| 2009/0071585 A1 | 3/2009 | Tanno |

FOREIGN PATENT DOCUMENTS

| EP | 155210 | * | 9/1985 |
| EP | 1072447 | * | 10/2001 |
| JP | 2003-226104 | * | 8/2003 |
| JP | 2004-291855 | | 10/2004 |
| JP | 2005-138760 | | 6/2005 |
| WO | WO 2005/012007 | | 2/2005 |

OTHER PUBLICATIONS

Machine translation of JP 2003-226104, Tanno, A., Aug. 2003.*

* cited by examiner

*Primary Examiner*—Justin Fischer
(74) *Attorney, Agent, or Firm*—Greer, Burns & Crain, Ltd.

(57) ABSTRACT

A pneumatic having a porous member mounted on an inner surface facing a cavity of the tire. The porous member has ends located on front and back sides thereof in the rotation direction of the tire. At least the back end has corners located on opposite sides thereof in the widthwise direction of the porous member, the corners being chamfered.

29 Claims, 9 Drawing Sheets

PNEUMATIC TIRE

TECHNICAL FIELD

The present invention relates to pneumatic tires having a low noise level, and more particularly, to a pneumatic tire which can improve durability of a porous member for sound absorption mounted on the inner surface of the tire.

TECHNICAL BACKGROUND

One of the causes that produce tire noise is cavity resonance sound arising from vibration of air charged into the cavity of a pneumatic tire. When the tire is run on a road surface under load, the tread portion of the tire that contacts it vibrates because of the irregularity of the road surface, and the vibration of the tread portion causes the air within the tire cavity to vibrate, thereby producing the cavity resonance sound. It is known that the frequency of sound heard as noise in the cavity resonance sound is near 250 Hz.

As an approach for reducing such cavity resonance sound, the present applicants have proposed a pneumatic tire which can effectively reduce the cavity resonance sound, the tire having porous members of resin foam such as urethane foam placed within the tire cavity in such a manner that the cross-sectional area of the tire cavity varies around its circumference (for example, see Patent Document 1). The porous members, which are in the form of rectangular solids, are mounted on the inner surface of the tread portion of the pneumatic tire along therewith with an elastic fixing band.

However, with respect to the porous members mounted on the inner surface of the tire as described above, it has found in actual vehicle running tests that the corners located on the opposite sides, in the widthwise direction of the porous member, of the ends positioned back and forth in the rotation direction of the tire, especially the back end, drop out and are damaged early; there is still room for improvement in terms of durability. Patent Document 1: Japanese Patent Application Kokai Publication No. 2002-28432

DISCLOSURE OF THE INVENTION

An object of the present invention is to provide a pneumatic tire having a porous member for sound absorption mounted on the inner surface of the tire, capable of suppressing damage to the porous member to thereby improve durability of the porous member.

In order to achieve the above object, the present invention provides a pneumatic tire having a porous member mounted on an inner surface facing a cavity of the tire, the porous member having ends located on front and back sides thereof in a direction of rotation of the tire, at least the back end having corners located on opposite sides thereof in a widthwise direction of the porous member, the corners being chamfered.

The present invention provides another pneumatic tire having a porous member mounted on an inner surface facing a cavity of the tire, the porous member having ends located on front and back sides thereof in a direction of rotation of the tire, at least the back end having corners located on opposite sides thereof in a direction of thickness of the porous member, one of the corners being chamfered.

According to the present invention described above, by chamfering the back end of the porous member where damage occurs as described above, chipping of the corners of the back end located on the opposite sides in the widthwise direction of the porous member can be suppressed, thereby allowing durability of the porous member to be improved.

BEST MODES FOR CARRYING OUT THE INVENTION

Embodiments of the present invention will be described in detail below with reference to the attached drawings.

Figure 1:
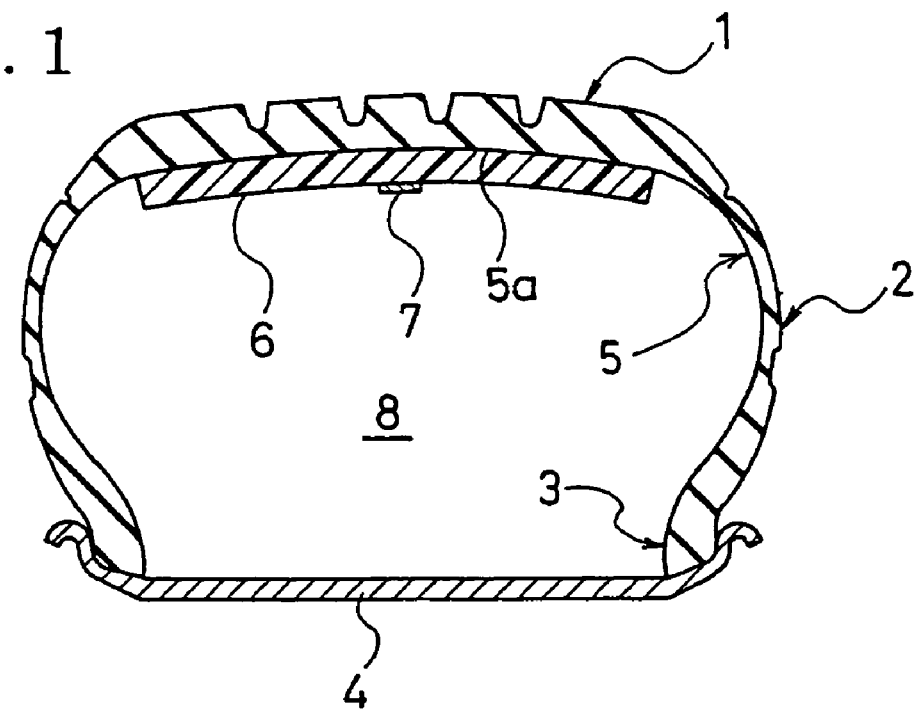
FIG. 1 is a tire meridian cross-sectional view showing an embodiment of a pneumatic tire according to the present invention with the tire mounted on a rim.
Figure 2:
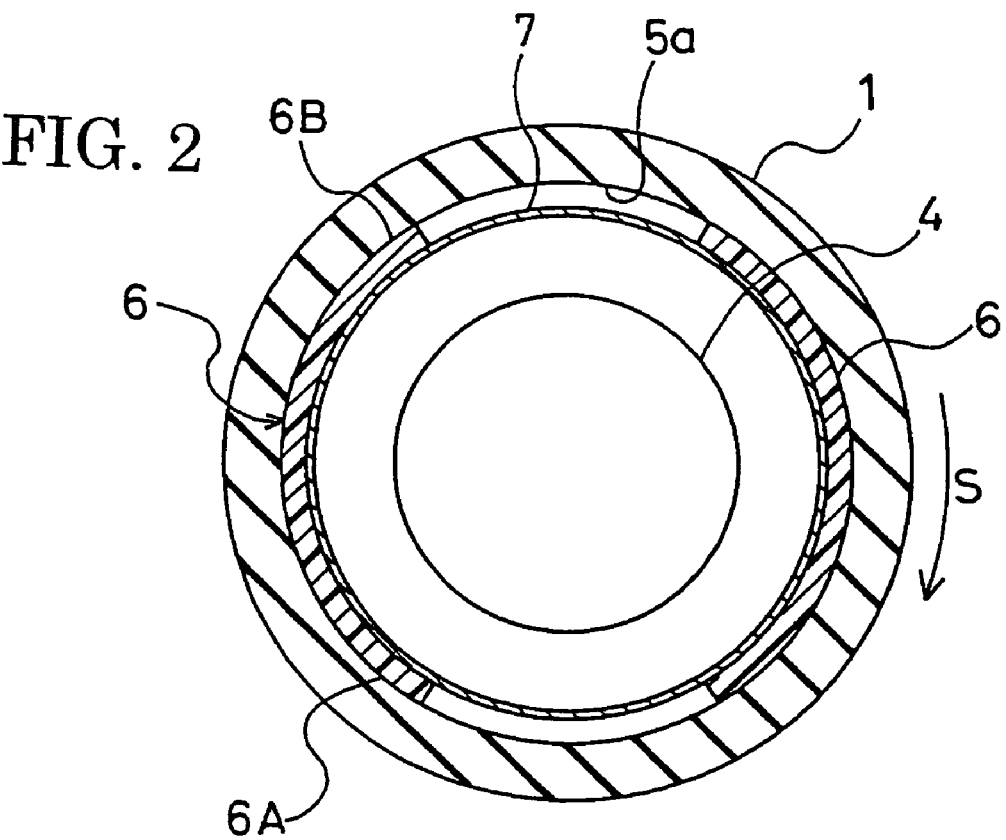
FIG. 2 is a cross-sectional view of the pneumatic tire in FIG. 1, taken along the tire equatorial plane.

Referring to FIGS. 1 and 2, there is shown an embodiment of a pneumatic tire according to the present invention with the tire mounted on a rim; reference numeral 1 denotes a tread portion, reference numeral 2 denotes a sidewall portion, reference numeral 3 denotes a bead portion, and reference numeral 4 denotes a rim.

The pneumatic tire has an inner surface 5 facing a cavity 8 of the tire. Porous members 6 for sound absorption formed of resin foam such as urethane foam are mounted on a region 5a of the inner surface 5 located in the tread portion 1 so as to be pressed against the inner surface 5 with an elastic band 7. Two porous members 6, which are formed with a rectangular shape in cross section and flexible, are disposed at prescribed intervals in the circumferential direction of the tire, whereby the cross-sectional area of the tire cavity 8 closed by the rim 4 varies around the circumference; the cavity resonance sound is reduced by the sound absorbing effect of the porous members 6 themselves and the variation of the cross-sectional area of the tire cavity 8.

Figure 3:
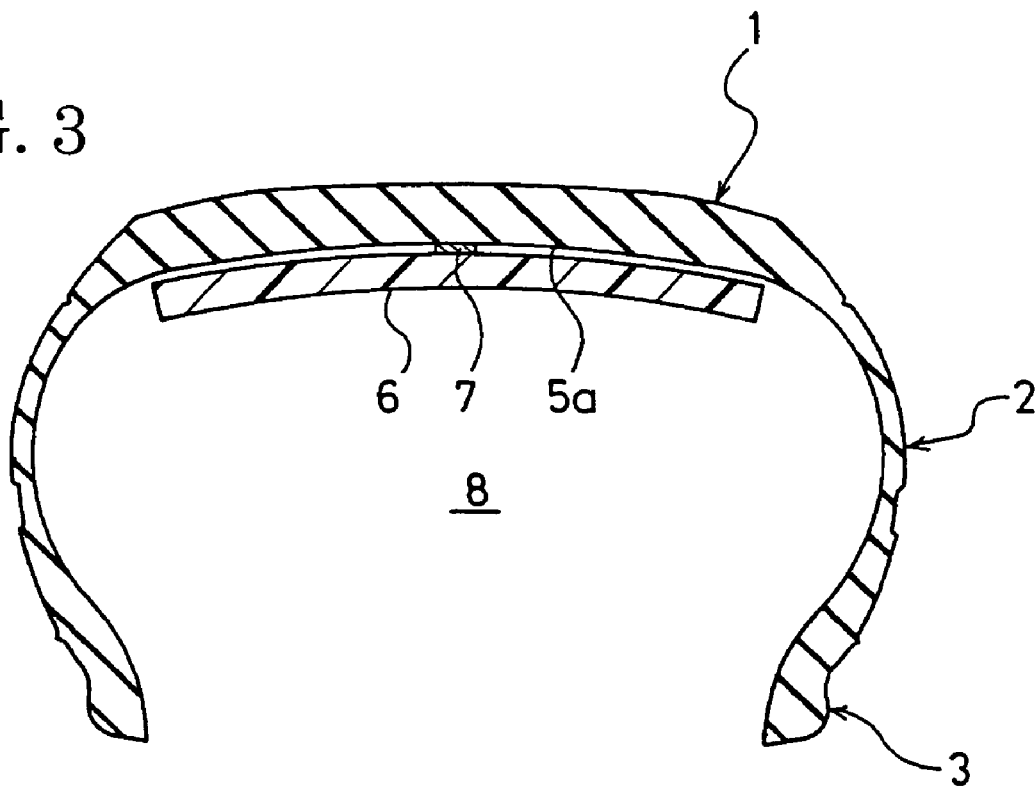
FIG. 3 is a tire meridian cross-sectional view showing another example relating to the attachment of porous members.

In FIGS. 1 and 2, the porous members 6 are attached to the tire inner surface 5 with the elastic band 7 fixed to the inner circumferential sides of the porous members 6; however, as shown in FIG. 3, the elastic band 7 may be placed on the tire inner surface 5 by fixing it to the outer circumferential sides of the porous members 6.

It is preferable in terms of most effectively reducing the cavity resonance sound that two porous members 6 be placed at opposing locations as shown in FIG. 2; however, the number of the porous members 6 is not limited thereto as is obvious; the number of the porous members 6 may be one, or plural more than two.

The width of each porous member 6 is preferably equal to or more than 40% of the maximum width of the tire in a state before chamfering described later in the viewpoint of effectively reducing the cavity resonance sound. The upper limit of the width of each porous member 6 is preferably equal to or more than 90% of the tire maximum width. If the width of the porous member 6 exceeds 90%, there is a risk that the opposite ends of the porous member 6 located in its widthwise direction will be damaged since interference of the sidewalls 2 occurs to them.

Figure 4:
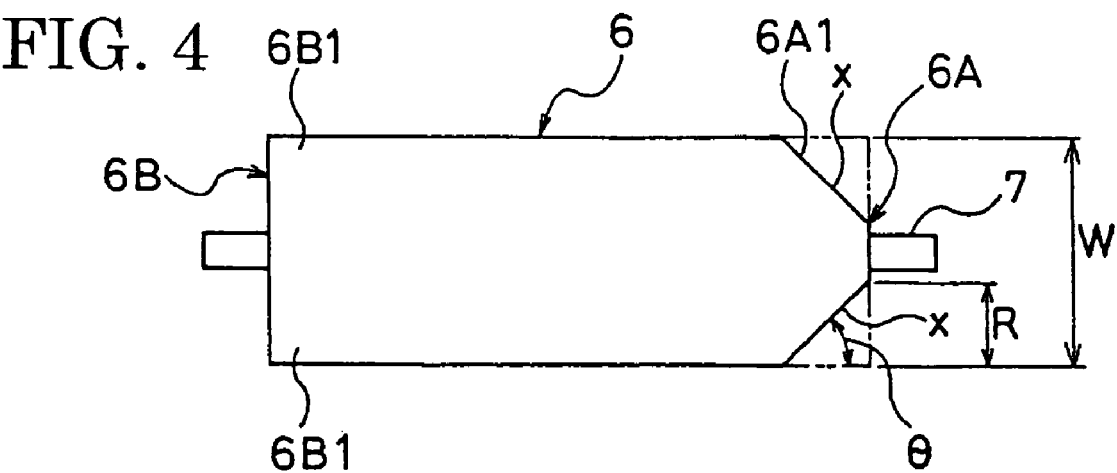
FIG. 4 is a plan view showing a porous member in FIG. 1 removed from the tire with the porous member reduced in size.

The porous members 6 attached to the tire inner surface 5 with the elastic band 7 as described above, each have an end 6A located back in the rotation direction of the tire shown in arrow S, the back end 6A having corners 6A1 located on the opposite sides of the porous member in its widthwise direction, the corners 6A1 each being cut off with a flat surface (linearly cut off in plan view) as shown in FIG. 4 so as to have a planar chamfer x.

Figure 5:
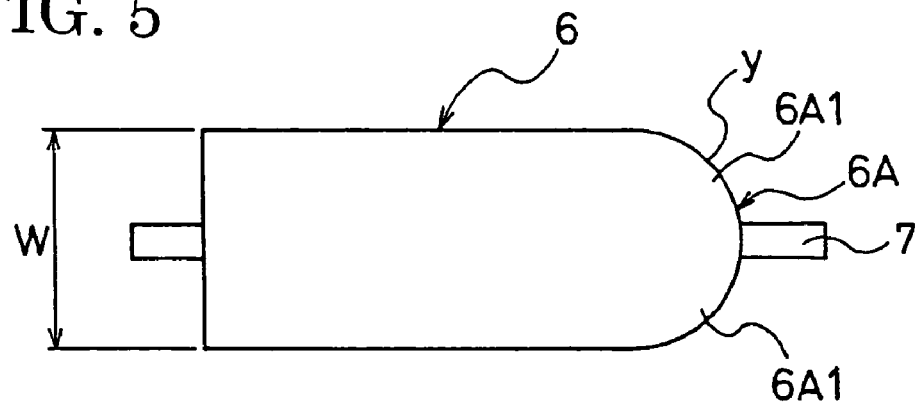
FIG. 5 is a plan view showing another example of the porous member.

In the alternative of the flat surface, the corners each may be cut off with a rounded surface as shown in FIG. 5 so as to have a chamfer y in the form of a curved surface. In FIG. 5, the corners 6A1 each are chamfered with a circular arc having a prescribed curvature radius in plan view; however, the corners each may be cut off with a rounded surface having a shape of an ellipse to form the chamfer y. The chamfer size can be properly selected although FIG. 6 shows an example of the case where the corners each are cut off with a circular arc with a radius having a half of the width of the back end 6A.

Figure 6:
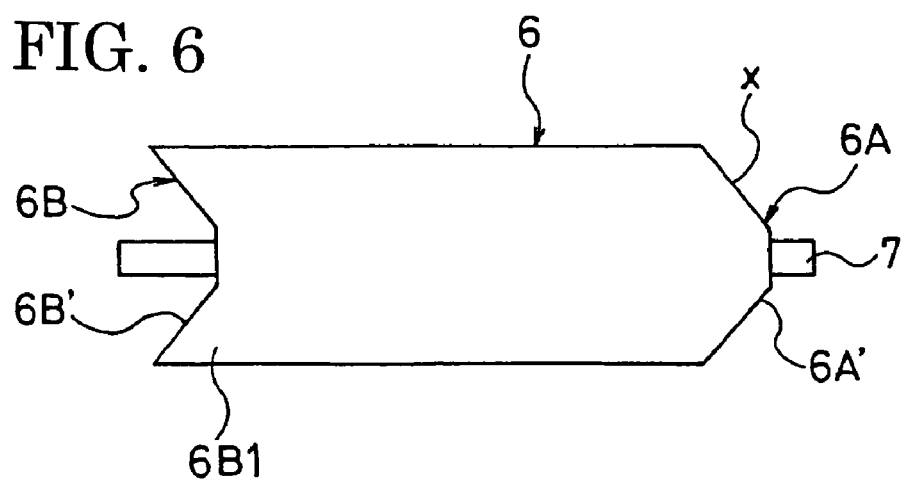
FIG. 6 is a plan view showing still another example of the porous member.

Each of the porous members 6 shown in FIGS. 4 and 5 is arranged such that a porous member rectangular in shape in plan view before chamfering is chamfered and the corners 6B1 located on the opposite sides of the front end 6B in the widthwise direction thereof are right-angled; however, as shown in FIG. 6, the corners 6B1 on the opposite sides may project so that, when the front end 6B of a porous member 6 is contacted with the back end 6A of a porous member 6, the end surface 6B' of the frond end 6B fits in the end surface 6A' of the back end 6A.

Figure 7:
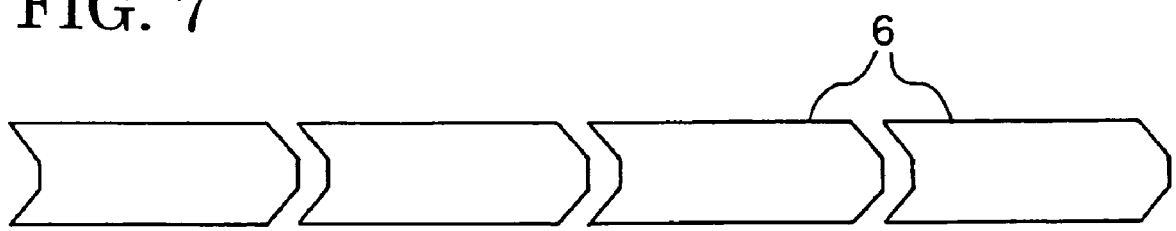
FIG. 7 is an explanatory drawing showing a method of producing the porous member in FIG. 6.

Thus when porous members 6 are formed by cutting a long porous material as shown in FIG. 7, the porous members can be easily formed without occurrence of cutting scrap that is waste. FIG. 6 shows an example of the case where the opposite corners 6A1 of the back end 6A are each cut off with a flat surface; however, the same goes for the case where the opposite corners 6A1 of the back end 6A are each cut off with a rounded surface.

Although not shown in the drawings, the pneumatic tire has a carcass ply extending between the right and left bead portions 3, the opposite ends of the carcass ply being wrapped from the inner sides of the tire toward the outer sides thereof around bead cores embedded in the bead portions. A plurality of belt plies are provided on the radially outer side of the carcass ply in the tread portion 1.

The present inventors have found the following when actual vehicle and drum running tests were repeatedly performed with respect to the damaged of the conventional porous members in the form of rectangles in plan view and the damage occurrence was observed.

Figure 8:
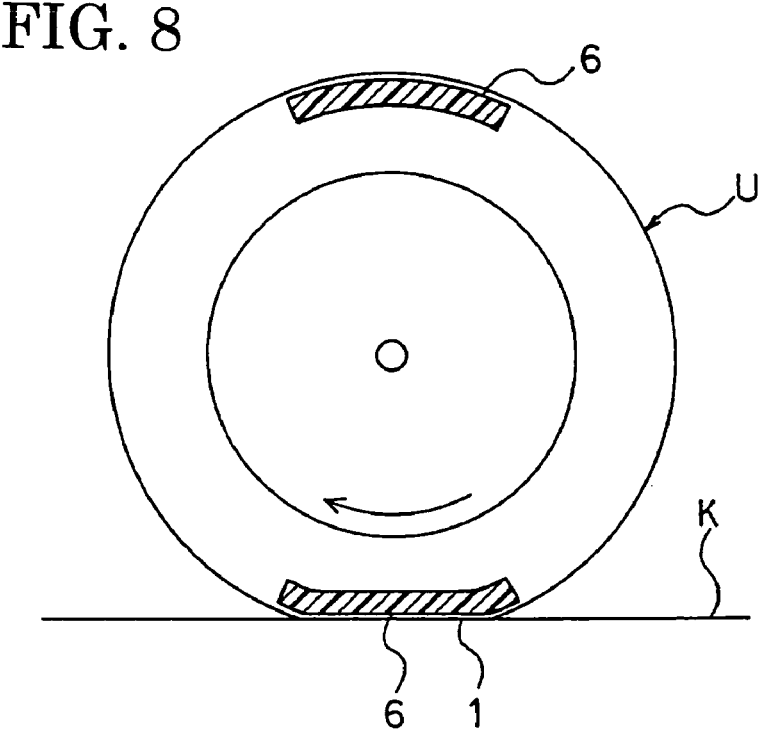
FIG. 8 is a drawing illustrating the operation of the pneumatic tire having porous members.

As shown in FIG. 8, a porous member 6 deforms radially of a tire U, following the deformation of the portion of the tread 1 of the tire that contacts with a road surface K. The deformation of the porous member repeatedly occurs with the rotation of the tire U; when deformed, the void spaces of the porous member 6 collapsed to thereby contact the portions surrounding the void spaces with each other. It has been found that, in the conventional porous member in the form of a rectangle in plan view without chamfering, damage occurs to contact portions on the edge sides of the porous member that more greatly deform, and is developed inward. Since the back end of the porous member is located on the kicking side of the tire U, it is speculated that a great reaction force is applied thereto at the time of tire-kicking; the edge portions of the corner located on each side of the back end in its widthwise direction were firstly damaged arising from contact with each other, and the damage was developed inwardly, whereby the corners of the back end are chipped, early damaging the corners of the back end.

When the opposite corners 6A1 of the back end 6A where the damage occurred as described above were chamfered, it has been found that the opposite corners 6A1 of the back end 6A were not easily chipped in actual vehicle and drum running tests and the damage was restricted. Based on this founding, the opposite corners 6A1 of the back end 6A are chamfered in the present invention. Accordingly, the damage to the opposite corners 6A1 of the back end 6A is suppressed, thereby allowing durability of the porous member 6 to be improved.

As shown in FIG. 4, when the corners 6A1 of the back end 6A of the porous member 6 are each cut off with a flat surface, the following relationships are preferably fulfilled if R (mm) is the length of the chamfer x in the widthwise direction of the porous member, W (mm) is the width of the back end 6A, T (mm) is the thickness of the back end 6A, and θ (°) is the angle of the chamfer x with respect to the longitudinal direction of the porous member, in plan view of the porous member 6 (porous member in a state where it is not mounted on the tire) shown in FIG. 4.

$$2T \leqq R \leqq W/2$$

$$20° \leqq \theta \leqq 70°$$

If the length R is less than 2T, and if the angle θ is out of the above range, the improvement effect of durability is reduced. The reason the length R is equal to or less than W/2 is to take a balance of the porous member 6 in its widthwise direction. The opposite corners 6A1 are preferably symmetrical in shape in terms of appearance.

Figure 9:
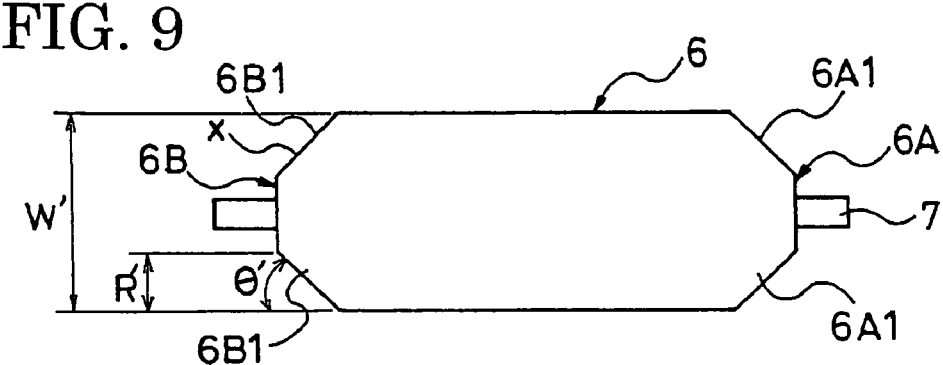
FIG. 9 is a plan view showing still another example of the porous member.
Figure 10:
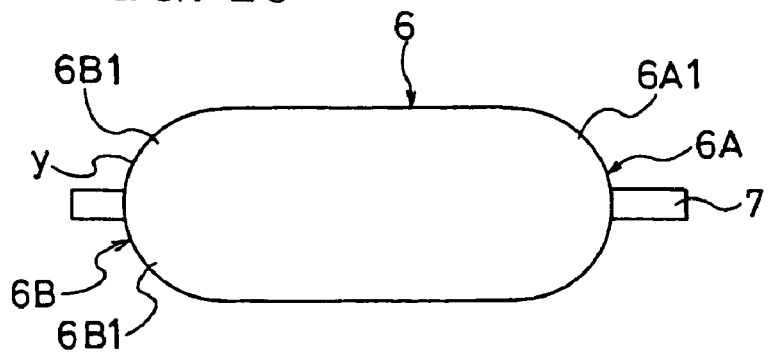
FIG. 10 is a plan view showing still another example of the porous member.

As shown in FIGS. 9 and 10, the corners 6B1 located on the opposite sides of the front end 6B of each porous member 6 in the widthwise direction of the porous member are preferably chamfered. The porous member 6 shown in FIG. 9 has the same structure as the porous member 6 shown in FIG. 4 except that the opposite corners 6B1 of the front end 6B are each cut off with a flat surface, as are those of the back end 6A, so as to have a planar chamfer x. The porous member 6 shown in FIG. 10 has the same structure as the porous member 6 shown in FIG. 5 except that the opposite corners 6B1 of the front end 6B are each cut off with a rounded surface having a prescribed curvature radius, as are those of the back end 6A, so as to have a chamfer y in the form of a curved surface.

In actual vehicle and drum running tests, after the opposite corners of the back end of the conventional porous member were damaged, the opposite corners of the front end thereof were similarly damaged. When the opposite corners 6B1 of the front end 6B were chamfered, it has been found that the opposite corners 6B1 of the front end 6B were not easily chipped and the damage was restricted. Based on this founding, the opposite corners 6B1 of the front end 6B are chamfered. Accordingly, the damage to the opposite corners 6B1 of the front end 6B can be suppressed, thereby allowing durability of the porous member 6 to be further improved.

When the corners 6B1 of the front end 6B of the porous member 6 are each chamfered with a flat surface, the dimensional matters of chamfering can be the same as the case where the corners 6A1 of the back end 6A are chamfered.

That is, if R' (mm) is the length of the chamfer x of the front end 6B in the widthwise direction of the porous member, W' (mm) is the width of the front end 6B, T' (mm) is the thickness of the front end 6B, and θ' (°) is the angle of the chamfer x with respect to the longitudinal direction of the porous member, in plan view of the porous member 6 (porous member in a state where it is not mounted on the tire) shown in FIG. 9, the following relationships are preferably fulfilled.

$$2T' \leqq R' \leqq W'/2$$

$$20° \leqq \theta' \leqq 70°$$

Figure 11:
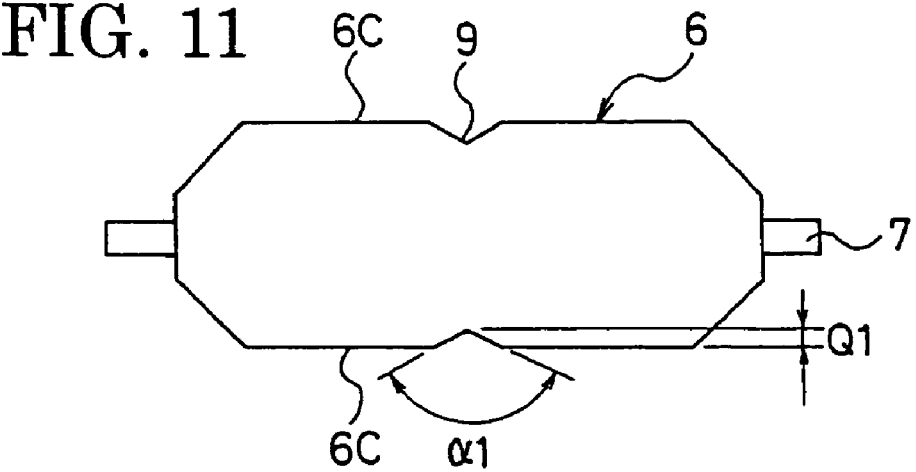
FIG. 11 is a plan view showing still another example of the porous member.
Figure 12:
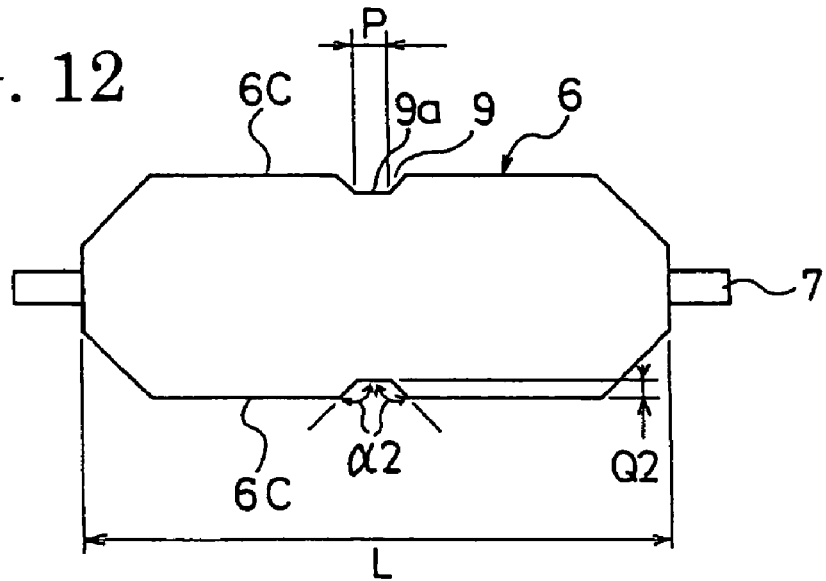
FIG. 12 is a plan view showing still another example of the porous member.

It is more preferable that, as shown in FIG. 11 or 12, the porous member 6 have side surfaces 6C located on the opposite sides of the porous member 6 in its widthwise direction, the middle portions (an example of the center portions is shown in the drawings) of the side surfaces having notches 9. The porous member 6 shown in FIG. 11 has notches 6 triangular in shape, and the porous member 6 shown in FIG. 12 has notches 6 trapezoidal in shape.

The conventional porous member were damaged such that after the opposite corners of the front end were damaged, the side surfaces located on the opposite sides of the porous member in its widthwise direction were similarly damaged. When the notches 9 were provided as described above, it has been found that the side surfaces 6C were not easily chipped in actual vehicle and drum running tests and the damage was restricted. Based on this founding, the notches 9 are provided in the side surfaces 6C of the porous member 6. Accordingly, the damage to the side surfaces 6C of the porous member 6 can be suppressed, thereby allowing durability of the porous member 6 to be still further improved.

One or more notches 9 are preferably provided in each of the side surfaces 6C, but may be provided in one of the side surfaces 6C; one or more notches 9 can be provided in at least one of the side surfaces 6C.

When the triangle-shaped notches 7 are provided in the side surfaces 6C of the porous member 6 as shown in FIG. 11, the length (depth) Q1 (mm) of each notch 9 in the widthwise direction of the porous member preferably satisfies $T''/3 \leqq Q1 \leqq 2T''$ with respect to the thickness T'' of the side end of the porous member 6 where the notch 9 is located. If the length Q1 is less than T''/3, the improvement effect is reduced, and if the length Q1 exceeds 2T'', durability is deteriorated because the porous member 6 is greatly constricted entirely. The open angle α1 (°) of the notch 9 is preferably equal to or more than 90°. If the open angle α1 is less than 90°, a crack is caused at the corner because the angle thereof is acute-angled. The open angle α1 is more preferably equal to or more than 120°. The upper limit of the open angle α1 is preferably equal to or less than 150° in terms of processing efficiency.

When the trapezoid-shaped notches 9 are provided as shown in FIG. 12, the length (depth) Q2 (mm) of each notch 9 in the widthwise direction of the porous member preferably satisfies $T''/3 \ Q2 \leqq 2T''$ as is that of the triangle-shaped notches 9. The notch bottom length P (mm) of the trapezoid-shaped notch 9 that is less than the length of the opening thereof is preferably equal to or more than ⅓ of the entire length L (mm) of the porous member 6. If the notch bottom length P is greater than ⅓ of the entire length L, it is not preferable because it is difficult to escape stresses applied thereto. The lower limit of the notch bottom length P is 0 mm; that is, the notch is a triangle-shaped notch 9 in FIG. 11. The open angle α2 (°) of the notch 9 with respect to the notch bottom 9a is preferably equal to or more than 90°, and more preferably equal to or more than 120° because of the same reason mentioned above. The upper limit of the open angle α2 is preferably the same as that of the open angle α1 of the triangle-shaped notch 9.

Figure 13:
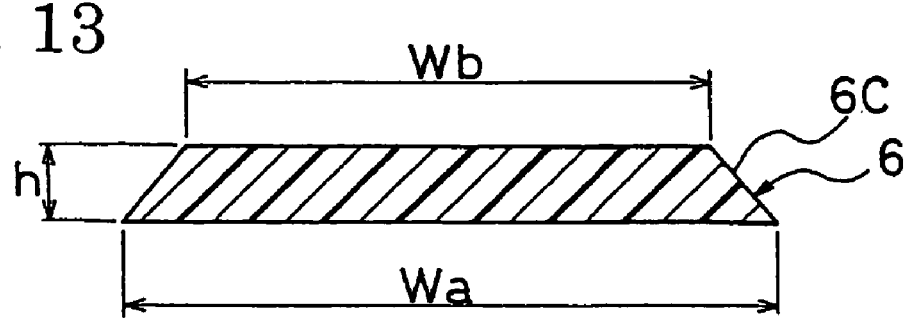
FIG. 13 is a cross-sectional view showing still another example of the porous member, taken along its widthwise direction.
Figure 14:
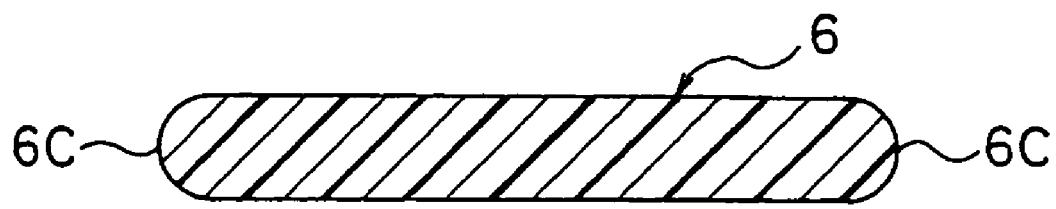
FIG. 14 is a cross-sectional view showing still another example of the porous member, taken along its widthwise direction.
Figure 15:
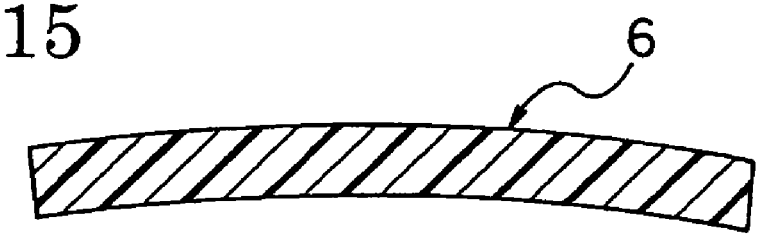
FIG. 15 is a cross-sectional view showing still another example of the porous member, taken along its widthwise direction.

It is still more preferable that the above porous members 6 be formed as shown in FIGS. 13 to 15. The porous member 6 shown in FIG. 13 is trapezoidal in cross-sectional shape when taken along the widthwise direction thereof. The porous member 6 shown in FIG. 14 has opposite side surfaces 6C each in the form of a round surface (circular arc in cross section) that is convexed outward. The porous member 6 shown in FIG. 15 is curved in shape, extending along the region 5a of the inner surface 5 in the tread portion 1, the region being in the form of a curved surface.

Figure 16:
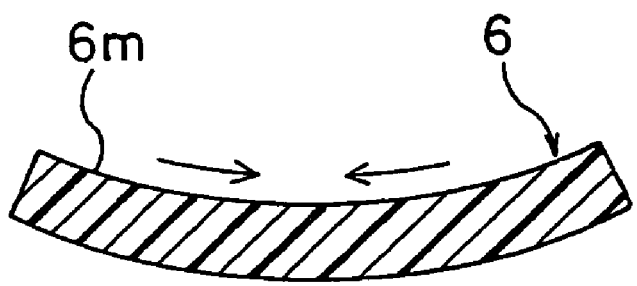
FIG. 16 is a drawing illustrating a state where forces act in a porous member.

As shown in FIG. 16, a porous member 6 deforms bending radially inwardly of the tire at the time of contact of the tire with the ground, and its inner surface 6m facing the tire cavity 8 is subjected to compression stresses mutually applied toward the center side in the widthwise direction of the porous member as shown in the arrows; by arranging the porous member as shown in FIG. 13, 14 or 15, surface stresses applied to the side ends of the inner surface 6m can be smaller, allowing damage to the side surfaces 6C to be suppressed. It is more preferable that the feature shown in FIG. 15 and the feature shown in FIG. 13 or 14 be combined to form a porous member 6.

Figure 17:
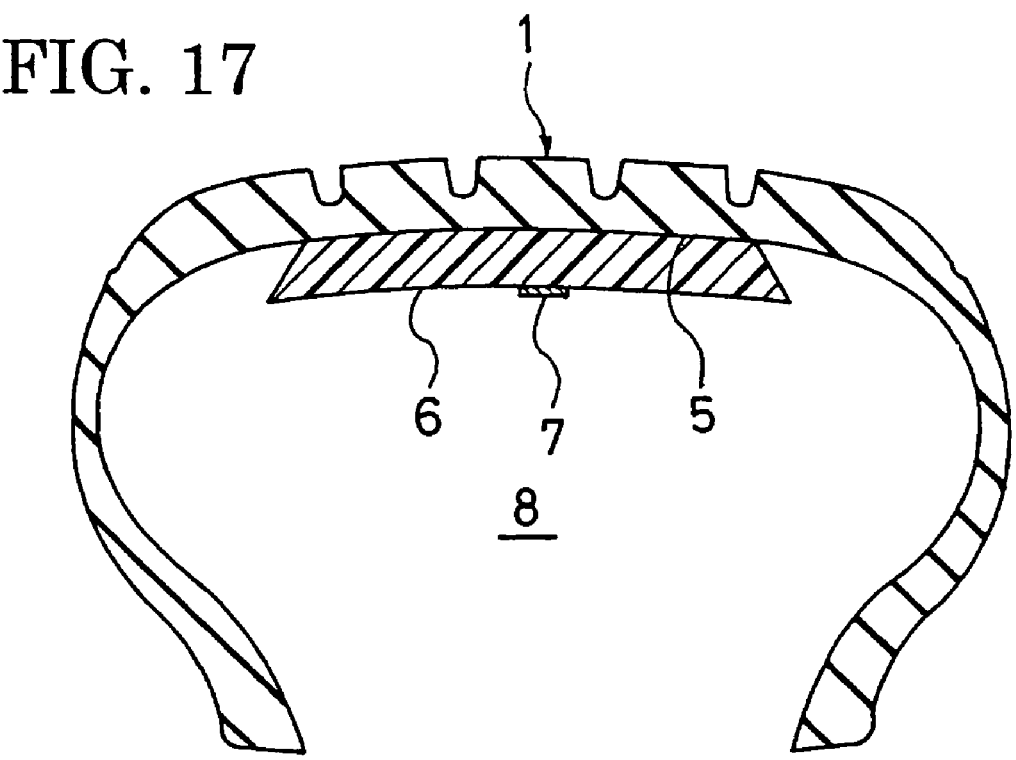
FIG. 17 is a tire meridian cross-sectional view showing an example of a pneumatic tire having the porous member in FIG. 13.
Figure 18:
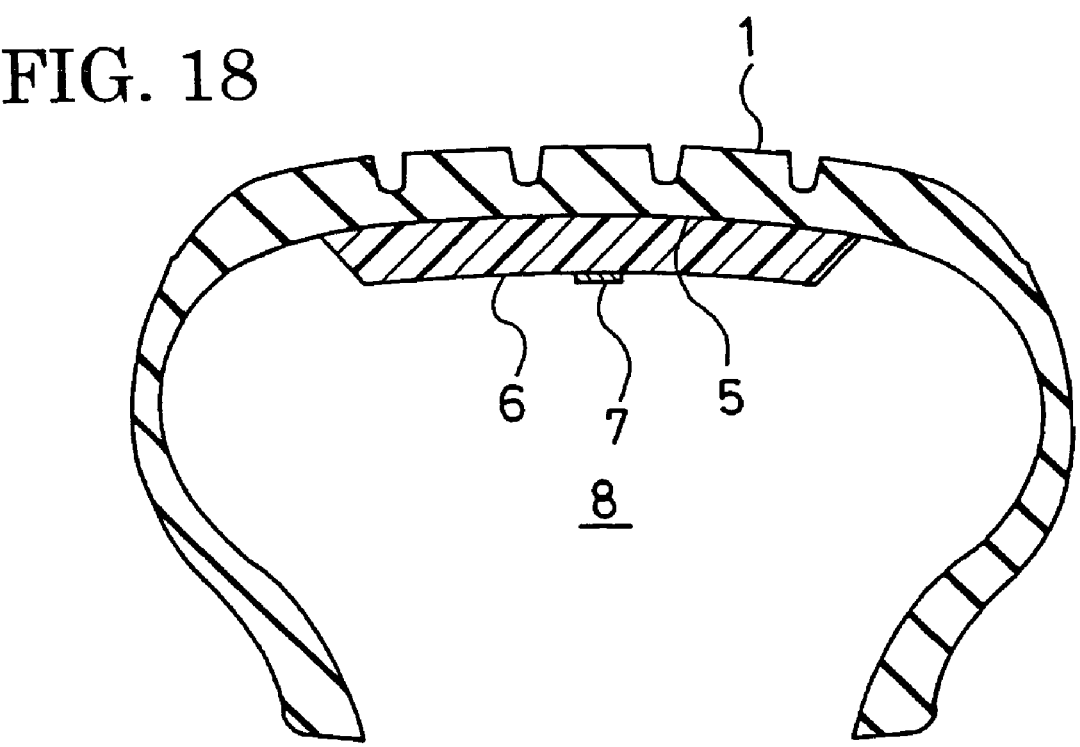
FIG. 18 is a tire meridian cross-sectional view showing another example of a pneumatic tire having the porous member in FIG. 13.

As shown in FIG. 13, when the porous member 6 is trapezoidal in cross-sectional shape, the porous member 6 may be attached with either of the lower base surface or upper base surface of the porous member 6 facing the inner surface 5 of the tire as shown in FIGS. 17 and 18.

If Wa (mm) is the length of the lower base of the trapezoid, Wb (mm) is the length of the upper base thereof, and h (mm) is the height thereof, as shown in FIG. 13, it is preferable in terms of effectively suppressing damage to the side surfaces 6c that the relationship among them satisfies $h/2 \leq |Wa-Wb| \leq 4h$.

Figure 19:
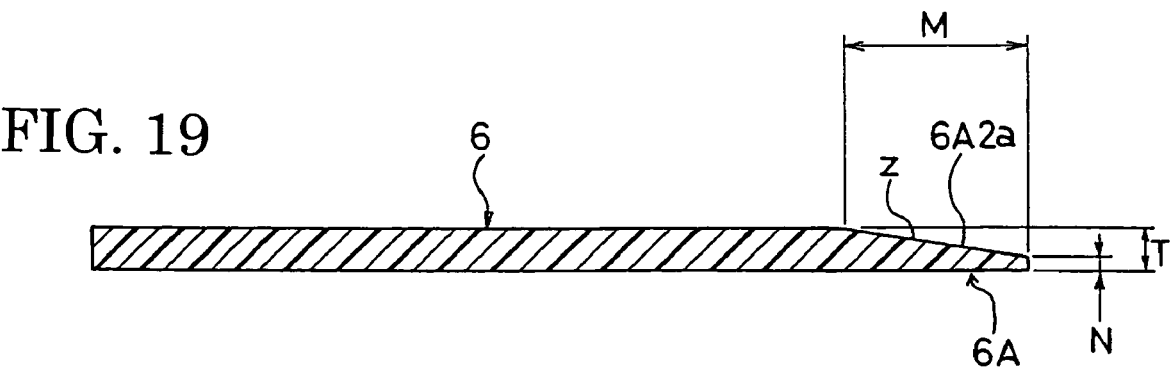
FIG. 19 is a cross-sectional view showing still another example of the porous member, taken along its longitudinal direction.
Figure 20:
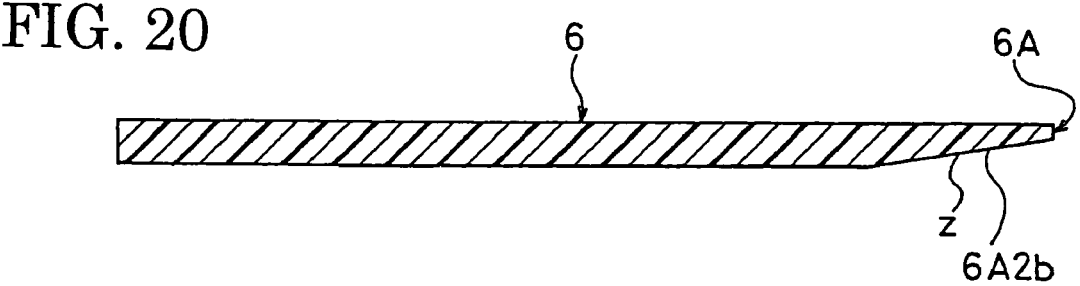
FIG. 20 is a cross-sectional view showing still another example of the porous member, taken along its longitudinal direction.

FIGS. 19 and 20 show still other exemplary porous members 6. In the alternative of chamfering of the corners 6A1 of the back end 6A described above, the porous members 6 shown in FIGS. 19 and 20 are arranged such that one of the corners 6A2a and 6A2b located on the opposite sides of the back end 6A in the thickness direction of the porous member is chamfered with a flat surface. The porous member 6 shown in FIG. 19 is arranged such that the corner 6A2a located on the tire inner surface 5 side is chamfered, and the porous member 6 shown in FIG. 20 is arranged such that the corner 6A2b located on the tire cavity 8 side is chamfered. It has been found in actual vehicle and drum running tests that these arrangements can also suppress chipping of the opposite corners 6A1 of the back end 6A; base on this founding, one of the corners 6A2a and 6A2b located on the opposite sides of the back end 6A in the thickness direction of the porous member is chamfered.

The porous member 6 is preferably arranged such that both of each corner 6A1 and one of the corners 6A2a and 6A2b of the back end 6A are chamfered in terms of further improving the restriction effect of chipping of the corners 6A1.

When one of the corners 6A2a and 6A2b is cut off to have a planar chamfer z as shown in FIGS. 19 and 20, the length M (mm) of the chamfer z in the longitudinal direction of the porous member preferably satisfies $T \leq M \leq 2T$ with respect to the thickness T of the back end 6A. If the length M is less than T, it is difficult to obtain the improvement effect. If the length M is greater than 2T, there is a risk that the porous member does not follow the tire inner surface 5 or the elastic band 7. The thickness N (mm) of the edge of the back end 6A after chamfering preferably satisfies $T/4 \leq N \leq 3T/4$. If the edge thickness N is less than T/4, the edge is too thin in thickness, deteriorating durability. If the edge thickness N is greater than 3T/4, the improvement effect is reduced.

Figure 21:
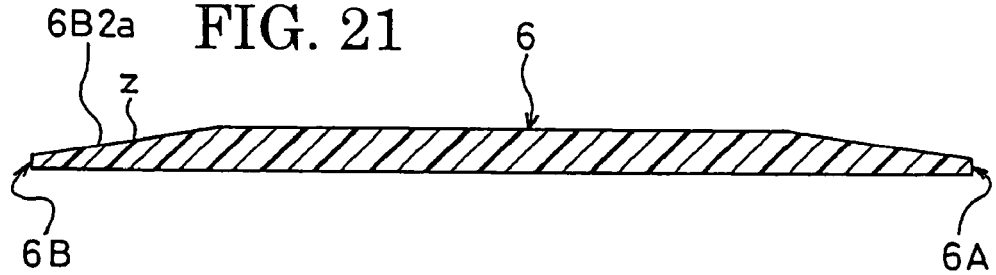
FIG. 21 is a cross-sectional view showing still another example of the porous member, taken along its longitudinal direction.
Figure 22:
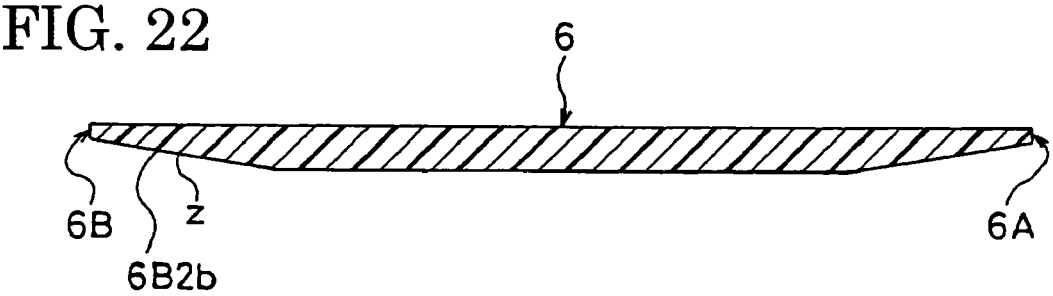
FIG. 22 is a cross-sectional view showing still another example of the porous member, taken along its longitudinal direction.

As shown in FIGS. 21 and 22, the porous members 6 are each preferably arranged such that one of the corners 6B2a and 6B2b located on the opposite sides of the front end 6A in the thickness direction thereof is cut off to have a planar chamfer z in the front end 6B. The porous member 6 shown in FIG. 21 is arranged such that the corner 6B2a located on the tire inner surface 5 side is chamfered, and the porous member 6 shown in FIG. 22 is arranged such that the corner 6B2b located on the tire cavity 8 side is chamfered. The dimensional matters of chamfering can be the same as the above-described case where the corners 6A2a and 6A2b located on the opposite sides of the back end 6A in the thickness direction of the porous member are chamfered.

The porous members 6 shown in FIGS. 19 to 22 are arranged to have planar chamfers z formed therein, but may be arranged to have chamfers in the form of curved surfaces by cutting off with rounded surfaces having prescribed curvature radii.

Figure 23:
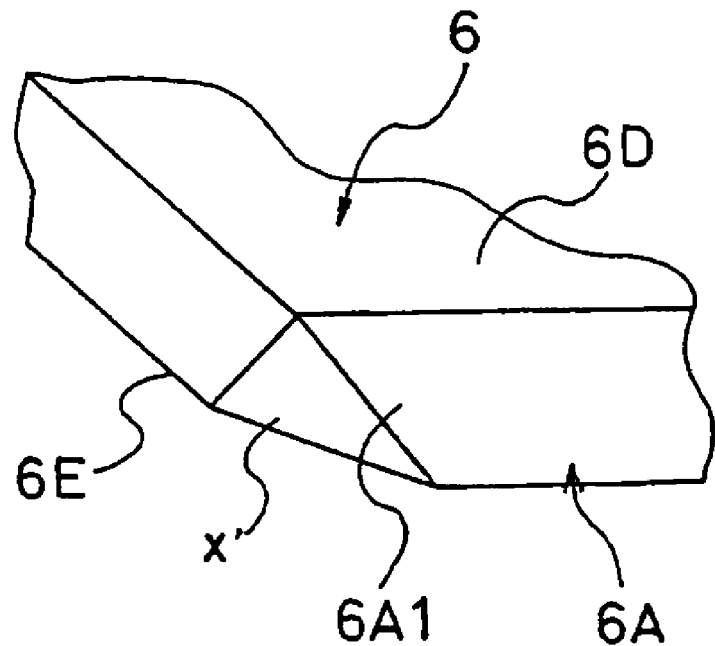
FIG. 23 is a partial perspective view showing still another example of the porous member.
Figure 24:
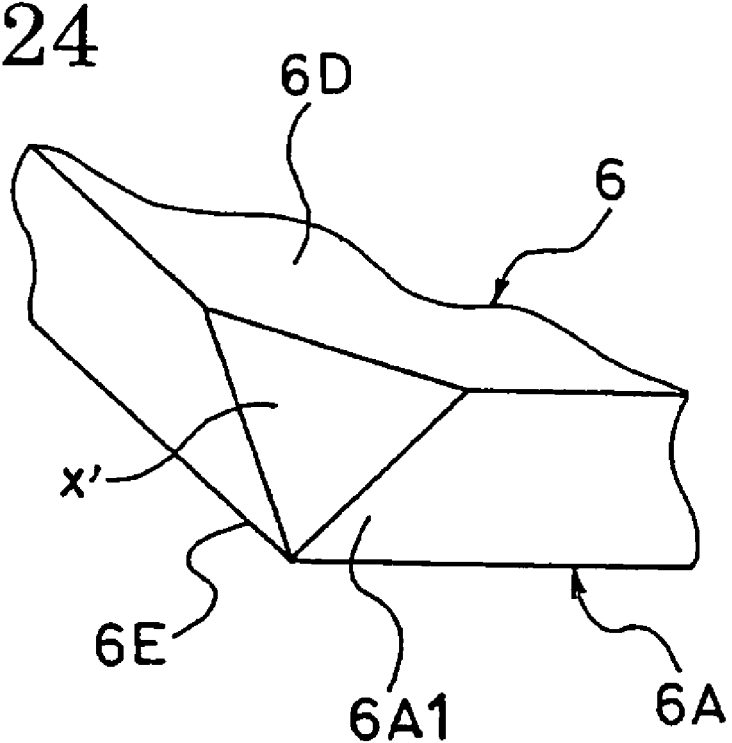
FIG. 24 is a partial perspective view showing still another example of the porous member.

When the opposite corners 6A1 of the back end 6A of the porous member 6 are each chamfered with a flat surface, as shown in FIG. 23 or 24, they may be each cut off with a chamfer x' that is not perpendicular to but inclined to the outer surface 6D of the porous member 6 facing the tire inner surface 5 and the inner surface 6E of the porous member 6 facing the tire cavity 8. By comparison, the chamfers x shown in FIGS. 4, 5 and the like are each perpendicular to the outer surface 6D and the inner surface 6E of the porous member 6.

In the present invention, the porous member may be arranged by properly combining respective features described above other than the above description.

Example

Prepared were tires having a tire size of 205/65R15 according to the present invention tires 1 to 5 and conventional tire, the present invention tire 1 having porous members shown in FIG. 4 which were mounted thereon as shown in FIGS. 1 and 2, the present invention tire 2 having porous members shown in FIG. 9 which were mounted thereon as shown in FIGS. 1 and 2, the present invention tire 3 having porous members shown in FIG. 12 which were mounted thereon as shown in FIGS. 1 and 2, the present invention tire 4 having porous members shown in FIG. 12 which were trapezoidal in cross-sectional shape and mounted thereon as shown in FIGS. 1 and 2, the present invention tire 5 having porous members shown in FIG. 19 which were mounted thereon as shown in FIGS. 1 and 2, the conventional tire having rectangular solid shaped porous members with no chamfering which were mounted thereon as shown in FIGS. 1 and 2.

Each of the porous members of the test tires is formed of urethane foam, and the sizes of the porous member having a rectangular solid shape before chamfering are 150 mm in width, 450 mm in length, and 20 mm in thickness.

In the porous members of the present invention tire 1, the length R of the chamfers of the back end is 60 mm, and the angle θ of the chamfers thereof is 45°. In the porous members of the present invention tire 2, the lengths R and R' of the chamfers of the back end and the frond end are 60 mm, and the angles θ and θ' of the chamfers thereof are 45°. The porous members of the present invention tire 3 has the same sizes as the porous members of the present invention tire 2 except that the open angle α2 of the notches is 120° and the length Q2 of the notches is 10 mm. The porous members of the present invention tire 4 has the same sizes as the porous members of the present invention tire 3 except that the value of |Wa-Wb| is 40 mm. In the porous members of the present invention tire 5, the length M of the chamfer of the back end is 30 mm, and the edge thickness N thereof is 10 mm.

Evaluation testing for durability was carried out on the test tires according to the method shown below, obtaining the results shown in Table 1.

Durability

The test tires were each seated on a rim having a rim size of 6.5 JJ, inflated to an air pressure of 150 kPa, and set to a drum testing machine. The tires were each run on the drum rotating at a speed of 80 km/h, and the running distance until chipping of the porous members occurred was measured. The measurement results are represented by an index where the conventional tire is 100. As the value is greater, the running distance until chipping of the porous members occurs is longer and durability is better.

TABLE 1

|  | Durability |
| --- | --- |
| Conventional Tire | 100 |
| Present Invention Tire 1 | 174 |
| Present Invention Tire 2 | 180 |

TABLE 1-continued

| | Durability |
|---|---|
| Present Invention Tire 3 | 185 |
| Present Invention Tire 4 | 189 |
| Present Invention Tire 5 | 160 |

As seen from Table 1, the present invention tires can greatly improve durability.

INDUSTRIAL APPLICABILITY

The pneumatic tire of the present invention having the aforementioned excellent effect can be very effectively employed as a low-noise tire to be mounted on a vehicle.

What is claimed is:

1. A pneumatic tire having a plurality of sound absorbing porous members mounted on an inner surface facing a cavity of the tire, wherein at least two of said sound absorbing porous members are arranged radially opposite of each other, and further wherein each of the sound absorbing porous members has ends located on front and back sides thereof in a direction of rotation of the tire, at least the back end having corners located on opposite sides thereof in a widthwise direction of each of the sound absorbing porous members, with the corners being chamfered to suppress chipping of said sound absorbing porous members, and further comprising an elastic band configured and arranged to attach the sound absorbing porous members to the tire, wherein the front end has corners located on opposite sides thereof in the widthwise direction of each of the sound absorbing porous members, the corners being chamfered.

2. A pneumatic tire according to claim 1, wherein the corners are each chamfered with a flat surface and the at least back end has chamfers on the opposite sides thereof in the widthwise direction of each of the sound absorbing porous members.

3. A pneumatic tire according to claim 2, wherein each of the sound absorbing porous members satisfies the following relationships:

$$2T \leq R \leq W/2$$

$$20° \leq \theta \leq 70°$$

R (mm) being the length of the chamfers in the widthwise direction of each of the sound absorbing porous members, W (mm) being the width of the back end, T (mm) being the thickness of the back end, and $\theta(°)$ being the angle of the chamfers with respect to a longitudinal direction of each of the sound absorbing porous members.

4. A pneumatic tire according to claim 1, wherein the corners are each chamfered with a round surface.

5. A pneumatic tire according to claim 1, therein the at least back end has corners located on opposite sides thereof in a direction of thickness of each of the sound absorbing porous members, with one of the corners being chamfered.

6. A pneumatic tire according to claim 5, wherein the one of the corners is chamfered with a flat surface, the back end has one chamfer on one side thereof in the thickness direction of the sound absorbing porous member, and each of the sound absorbing porous members satisfies the following relationships:

$$T \leq M \leq 2T$$

$$T/4 \leq N \leq 3T/4$$

M (mm) being the length of the one chamfer in a longitudinal direction of each of the sound absorbing porous members, T (mm) being the thickness of the back end, and N (mm) being the thickness of an edge of the back end after chamfering.

7. A pneumatic tire according to claim 1, wherein each of the sound absorbing porous members is trapezoidal in cross-sectional shape when taken along the widthwise direction of each of the sound absorbing porous members, and the following relationship is fulfilled:

$$h/2 \leq |Wa-Wb| \leq 4h$$

Wa (mm) being the length of a lower base of the trapezoid, Wb (mm) being the length of an upper base thereof, and h (mm) being the height thereof.

8. A pneumatic tire according to claim 1, wherein each of the sound absorbing porous members has opposite side surfaces located on opposite sides thereof in the widthwise direction of each of the sound absorbing porous members, the opposite side surfaces being each in a form of a round surface that is convexed outward.

9. A pneumatic tire according to claim 8, wherein at least one of the opposite side surfaces has a notch.

10. A pneumatic tire according to claim 1, wherein each of the sound absorbing porous members has a shape extending along the inner surface of the tire.

11. A pneumatic tire according to claim 1, wherein each of the sound absorbing porous members is rectangular in shape in plan view before chamfering.

12. A pneumatic tire according to claim 1, wherein each of the sound absorbing porous members is formed of resin foam.

13. A pneumatic tire according to claim 1, wherein each of the sound absorbing porous members is placed on a region of the inner surface located in a tread portion of the tire.

14. A pneumatic tire according to claim 1, wherein the sound absorbing porous members are formed of urethane foam.

15. A pneumatic tire according to claim 1, wherein each of said sound absorbing porous members is generally solid, other than void spaces formed by pores therein.

16. A pneumatic tire having a plurality of sound absorbing porous members mounted on an inner surface facing a cavity of the tire, wherein at least two of said sound absorbing porous members are arranged radially opposite of each other, and further wherein each of the sound absorbing porous members has ends located on front and back sides thereof in a direction of rotation of the tire, at least the back end having corners located on opposite sides thereof in a direction of thickness of each of the sound absorbing porous members, one of the corners being chamfered to suppress chipping of said sound absorbing porous members, and further comprising an elastic band configured and arranged to attach the sound absorbing porous members to the tire, wherein the front end has corners located on opposite sides thereof in the widthwise direction of each of the sound absorbing porous members, the corners being chamfered.

17. A pneumatic tire according to claim 16, wherein the one of the corners is chamfered with a flat surface, the back end has one chamfer on one side thereof in the thickness direction of each of the sound absorbing porous members, and each of the sound absorbing porous members satisfies the following relationships:

$$T \leq M \leq 2T$$

$$T/4 \leq N \leq 3T/4$$

M (mm) being the length of the one chamfer in a longitudinal direction of each of the sound absorbing porous members, T (mm) being the thickness of the back end, and N (mm) being the thickness of an edge of the back end after chamfering.

18. A pneumatic tire according to claim 16, wherein the front end has corners located on opposite sides thereof in the thickness direction of each of the sound absorbing porous members, with one of the corners being chamfered.

19. A pneumatic tire according to claim 16, wherein each of the sound absorbing porous members is trapezoidal in cross-sectional shape when taken along the widthwise direction of each of the sound absorbing porous members, and the following relationship is fulfilled:

$$h/2 \leq |Wa-Wb| \leq 4h$$

Wa (mm) being the length of a lower base of the trapezoid, Wb (mm) being the length of an upper base thereof, and h (mm) being the height thereof.

20. A pneumatic tire according to claim 16, wherein each of the sound absorbing porous members has opposite side surfaces located on opposite sides thereof in the widthwise direction of each of the sound absorbing porous members, the opposite side surfaces being each in a form of a round surface that is convexed outward.

21. A pneumatic tire according to claim 20, wherein at least one of the opposite side surfaces has a notch.

22. A pneumatic tire according to claim 16, wherein each of the sound absorbing porous members has a shape extending along the inner surface of the tire.

23. A pneumatic tire according to claim 16, wherein each of the sound absorbing porous members is rectangular in shape in plan view before chamfering.

24. A pneumatic tire according to claim 16, wherein each of the sound absorbing porous members is formed of resin foam.

25. A pneumatic tire according to claim 16, wherein each of the sound absorbing porous members is placed on a region of the inner surface located in a tread portion of the tire.

26. A pneumatic tire according to claim 16, wherein the sound absorbing porous members are formed of urethane foam.

27. A pneumatic tire according to claim 16, wherein each of said sound absorbing porous members is generally solid, other than void spaces formed by pores therein.

28. A pneumatic tire having a plurality of sound absorbing porous members mounted on an inner surface facing a cavity of the tire, wherein at least two of said sound absorbing porous members are arranged radially opposite of each other, and further wherein each of the sound absorbing porous members has ends located on front and back sides thereof in a direction of rotation of the tire, at least the back end having corners located on opposite sides thereof in a widthwise direction of each of the sound absorbing porous members, with the corners being chamfered to suppress chipping of said sound absorbing porous members, and wherein the front end has corners located on opposite sides thereof in the widthwise direction of each of the sound absorbing porous members, the corners being chamfered, wherein each of the sound absorbing porous members has opposite side surfaces on opposite sides thereof in the widthwise direction of each of the sound absorbing porous members, at least one of the opposite side surfaces having a notch.

29. A pneumatic tire having a plurality of sound absorbing porous members mounted on an inner surface facing a cavity of the tire, wherein at least two of said sound absorbing porous members are arranged radially opposite of each other, and further wherein each of the sound absorbing porous members has ends located on front and back sides thereof in a direction of rotation of the tire, at least the back end having corners located on opposite sides thereof in a widthwise direction of each of the sound absorbing porous members, one of the corners being chamfered to suppress chipping of said sound absorbing porous members, and wherein the front end has corners located on opposite sides thereof in the widthwise direction of each of the sound absorbing porous members, the corners being chamfered, wherein each of the sound absorbing porous members has opposite side surfaces on opposite sides thereof in the widthwise direction of each of the sound absorbing porous members, at least one of the opposite side surfaces having a notch.

* * * * *